US010233292B2

(12) United States Patent
Singh et al.

(10) Patent No.: US 10,233,292 B2
(45) Date of Patent: *Mar. 19, 2019

(54) RENEWABLE AROMATICS FROM LIGNOCELLULOSIC LIGNIN

(71) Applicant: Sandia Corporation, Livermore, CA (US)

(72) Inventors: Seema Singh, Fremont, CA (US); Patanjali Varanasi, Fremont, CA (US); Blake Simmons, San Francisco, CA (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 14/650,506

(22) PCT Filed: Dec. 9, 2013

(86) PCT No.: PCT/US2013/073936
§ 371 (c)(1),
(2) Date: Jun. 8, 2015

(87) PCT Pub. No.: WO2014/089574
PCT Pub. Date: Jun. 12, 2014

(65) Prior Publication Data
US 2015/0322214 A1 Nov. 12, 2015

Related U.S. Application Data

(60) Provisional application No. 61/734,898, filed on Dec. 7, 2012.

(51) Int. Cl.
C07G 1/00 (2011.01)
C08H 7/00 (2011.01)
D21C 3/20 (2006.01)
C08L 97/00 (2006.01)
D21C 11/00 (2006.01)

(52) U.S. Cl.
CPC ........... C08H 6/00 (2013.01); C07G 1/00 (2013.01); C08L 97/005 (2013.01); D21C 3/20 (2013.01); D21C 11/0007 (2013.01)

(58) Field of Classification Search
CPC ......... D21C 3/20; D21C 11/0007; C07G 1/00
See application file for complete search history.

(56) References Cited

U.S. PATENT DOCUMENTS

| 2007/0215300 | A1  | 9/2007  | Upfal et al. |                    |
|--------------|-----|---------|--------------|--------------------|
| 2008/0227162 | A1* | 9/2008  | Varanasi     | C12P 7/10          |
|              |     |         |              | 435/96             |
| 2010/0163018 | A1  | 7/2010  | Gifford et al.|                   |
| 2010/0196967 | A1* | 8/2010  | Edye         | C12P 7/10          |
|              |     |         |              | 435/105            |
| 2010/0279372 | A1* | 11/2010 | Cho          | C08H 8/00          |
|              |     |         |              | 435/165            |
| 2010/0319862 | A1* | 12/2010 | Rahman       | D21C 3/20          |
|              |     |         |              | 162/50             |
| 2011/0201096 | A1* | 8/2011  | Streffer     | C08H 8/00          |
|              |     |         |              | 435/277            |
| 2011/0225878 | A1* | 9/2011  | Moulijn      | C10G 1/04          |
|              |     |         |              | 44/388             |
| 2012/0178921 | A1* | 7/2012  | O'Connor     | C08H 8/00          |
|              |     |         |              | 536/56             |
| 2013/0252285 | A1* | 9/2013  | Blanch       | C08B 1/003         |
|              |     |         |              | 435/99             |
| 2013/0292331 | A1* | 11/2013 | Lipscomb     | B01D 61/58         |
|              |     |         |              | 210/640            |
| 2013/0302854 | A1* | 11/2013 | Tabata       | C13K 1/02          |
|              |     |         |              | 435/72             |
| 2014/0273104 | A1* | 9/2014  | Paripati     | C12P 19/14         |
|              |     |         |              | 435/99             |
| 2014/0309416 | A1* | 10/2014 | Teixeira     | C08H 8/00          |
|              |     |         |              | 536/127            |
| 2014/0326421 | A1* | 11/2014 | Fallon       | D21C 3/20          |
|              |     |         |              | 162/14             |
| 2015/0094459 | A1* | 4/2015  | Kroon        | C08H 8/00          |
|              |     |         |              | 530/507            |
| 2015/0122246 | A1* | 5/2015  | Sun          | C13K 1/02          |
|              |     |         |              | 127/37             |
| 2016/0122379 | A1* | 5/2016  | Singh        | C07G 1/00          |
|              |     |         |              | 530/507            |

FOREIGN PATENT DOCUMENTS

CN 102492154 A 6/2012

OTHER PUBLICATIONS

Dibble et al. Green Chem. 2011, 13, 3255-3264.*
Cheng et al. (Langmuir 2012, 28, 11850-11857) (Year: 2012).*
Creighton et al., "Aromatic Aldehydes from Spruce and Maple Woods," J Am. Chem. Soc., 63(1):312 (1941).
Li et al., "Extraction of Lignin from Sugar Cane Bagasse and its Modification into a High Performance Dispersant for Pesticide Formulations," J. Brazilian Chem. Soc., 22(10):1866-1871 (2011).
Sun et al., "Complete Dissolution and Partial Delignification of Wood in the Ionic Liquid 1-ethyl-3-methylimidazolium acetate," Green Chemistry 11:646-655 (2009).
Tan et al., "Extraction of Lignin from Lignocellulose at Atmospheric Pressure Using Alkylbenzenesulfonate Ionic Liquid," Green Chemistry 11(3):339-345 (2009).
Varanasi et al., "Survey of Renewable Chemicals Produced from Lignocellulosic Biomass during Ionic Liquid Pretreatment," Biotechnol Biofuels 6(1):14, Jan. 28, 2013.
Xin et al., "Extraction of Lignins from Aqueous-Ionic Liquid Mixtures by Organic Solvents," Biotechnol Bioeng, 109(2):346-352, Feb. 2012.
The International Search Report and Written Opinion from PCT/US2013/073936.
Li, et al., "Acidolysis of Wood in Ionic Liquids," Ind. Eng. Chem. Res., vol. 49, pp. 3126-3136 (2010).
Honglu, et al., "Wood liquefaction by ionic liquids," Holzforschung, vol. 60, pp. 509-512 (2006).

* cited by examiner

Primary Examiner — Liam J Heincer
(74) Attorney, Agent, or Firm — Kilpatrick, Townsend & Stockton LLP

(57) ABSTRACT

The present invention provides novel and improved processes for treating a lignocellulosic biomass or technical lignin using ionic liquids to obtain lignin breakdown products.

12 Claims, 3 Drawing Sheets

RENEWABLE AROMATICS FROM LIGNOCELLULOSIC LIGNIN

CROSS-REFERENCE TO RELATED APPLICATION

This application is a U.S. National Stage entry of International Application No. PCT/US2013/073936, filed Dec. 9, 2013, which claims priority to U.S. Provisional Application No. 61/734,898, filed Dec. 7, 2012, the disclosures of which are hereby incorporated by reference in the entirety for all purposes.

STATEMENT AS TO RIGHTS TO INVENTIONS MADE UNDER FEDERALLY SPONSORED RESEARCH AND DEVELOPMENT

The invention described and claimed herein was made utilizing funds supplied by the U.S. Department of Energy under Contract No. DE-AC02-05CH 11231. The government has certain rights in this invention.

BACKGROUND OF THE INVENTION

Biorefineries process biological materials such as lignocellulosic biomass, or components derived therefrom, to extract and produce valuable materials. Lignin utilization is a key biorefinery concept, and efficient lignin utilization is important for improving the economic viability of biorefineries. New technologies are needed to convert polymeric lignin into high value low molecular weight and/or monomeric feedstocks, including aromatic feedstocks.

Lignocellulosic biomass is derived from agricultural wastes, forest residues and dedicated energy crops. In recent years, tremendous effort has been applied to develop methods for extraction of useful compounds from lignocellulosic biomass. However, one of the greatest limitations facing the economic viability of this technology is the recalcitrant nature of the lignocellulosic biomass, which resists breakdown and extraction of useful compounds. This resistance necessitates the use of treatment steps to enhance the accessibility to and depolymerization of the carbohydrate and lignin components present in the lignocellulosic biomass. Most treatment processes are comprised of thermo-chemical processes that utilize combinations of high temperatures and pressures, or dilute acids or alkalis, to open up the structure of the biomass. Such processes necessitate the use of specialized equipment and high-energy inputs.

Polymeric lignin may be produced in various industrial processes such as during the pulping of hard and softwoods. Generally, it is produced as a byproduct in the paper and pulp industry. Polymeric lignin includes kraft lignin, produced via the kraft process, lignosulfonates, produced, e.g. from the sulfite pulping process, alkali lignin, produced, e.g. from treating the black liquor from the soda process with acid, and low sulfonate alkali lignin. As with lignocellulosic biomass, high-value lignin compounds may be further extracted, purified, and/or derivatized from polymeric lignin.

Ionic liquids (ILs) have come into prominence over recent years and have been used as innovative fluids for chemical processing. They are known as environmentally friendly solvents primarily due to their low volatility and their potential recyclability. Recently, the use of ILs for the treatment of biomass has been shown to be a promising technology, allowing for the solubilization of crystalline cellulose from biomass under relatively mild conditions.

The ionic liquid treatment process can generally be described as the dissolution of biomass into the ionic liquid at an elevated temperature with stirring, followed by the addition of a precipitant (or, alternatively, an anti-solvent) that precipitates the biomass from solution. This precipitant or anti-solvent is typically either water or ethanol, or some other solvent with hydrogen bonding capacity. Once the biomass has been precipitated, solid/liquid separation and downstream enzymatic or chemical processes of the now amorphous biomass may result in useful products.

Lignin components isolated from lignocellulosic biomass or polymeric lignin find use in many industrial processes such as the production of vanillin, flavorings and perfumes, plastics and polymers, carbon fiber, binders, adhesives, oil drilling mud, mud-sand cements, flame retardants, lime plaster, storage battery plates, nitrogenous fertilizers, gypsum wallboards, or as a dispersant, flotation agent, emulsifier, stabilizer, grinding agent, electrolytic refining agent, protein precipitant, tanning agent, crystal growth inhibitor, or as packaging material. Lignin is also a natural and renewable source for many low molecular weight chemicals like benzene, phenol, guaiacol, vanillic acid, methanol, acetic acid, DMSO, etc. Moreover, due to the high chemical energy of these lignin compounds, they can be used as fuel by directly burning, or conversion into a coal or petroleum substitute. Importantly, lignin components isolated from lignocellulosic biomass represent the only renewable source of these useful lignin-derived compounds.

Although treatment of lignocellulosic biomass with ionic liquids has met with success, ionic liquids are expensive and the treatment process is both energy and time intensive. As such, what is needed in the art is a process that employs less ionic liquid via higher loading capacity, and produces a supply of commercially useful, high-value, and renewable lignin compounds to help improve overall process economics. The present invention provides a treatment process that fulfills these and other needs.

BRIEF SUMMARY OF THE INVENTION

In one embodiment, the present invention comprises a method that includes contacting a starting material containing polymeric lignin with an ionic liquid to generate a solubilized material for at least about 3 hours, and extracting low molecular weight or monomeric non-polar aromatic lignin compounds from the ionic liquid with an extractant.

In another embodiment, the method further comprises precipitating a fraction of the solubilized material with a polar solvent to generate a precipitated fraction and a supernatant, and separating the precipitated fraction from the supernatant.

In some embodiments, the polar solvent of the precipitating step is selected from the group consisting of water, methanol, ethanol, propanol, isopropanol, butanol, pentanol, hexanol, heptanol, octonol, or isooctonol.

In some embodiments, the extractant is a non-polar solvent. In some embodiments, the extractant is selected from the group consisting of water, methanol, ethanol, propanol, isopropanol, butanol, pentanol, hexanol, heptanol, octanol, isooctonol, benzene, toluene, acetone, pentane, hexane, heptane, octane, isooctane, and a second IL. In some embodiments, the extractant is benzene, toluene, acetone, pentane, hexane, heptane, octane, or isooctane.

In some embodiments, the extracting step further comprises separating the extractant from the ionic liquid.

In some embodiments of the present invention, the ionic liquid is water miscible.

In one aspect of the present invention, the ionic liquid is [C₂mim][OAc].

In some embodiments of the present invention, the starting material is polymeric lignin or lignin-containing biomass.

In some embodiments of the present invention, the method further comprises separating the extracted lignin compounds from the non-polar solvent.

In some embodiments of the present invention, the step of separating the extracted lignin compound comprises distillation, or column fractionation.

One embodiment of the present invention includes a composition containing low molecular weight or monomeric non-polar aromatic lignin compounds formed from: i) solubilizing a lignocellulosic biomass or polymeric lignin in a solution comprising a water-miscible ionic liquid (IL); ii) extracting the lignin compounds from the ionic liquid by contacting the ionic liquid with an extractant; and iii) separating the lignin compounds from the non-polar solvent.

In some embodiments of a composition of the present invention, the ionic liquid is [C₂mim][OAc].

In some embodiments of a composition of the present invention, the extractant is selected from the group consisting of water, methanol, ethanol, propanol, isopropanol, butanol, pentanol, hexanol, heptanol, octanol, isooctonol, benzene, toluene, acetone, pentane, hexane, heptane, octane, isooctane, and a second IL.

DETAILED DESCRIPTION OF THE INVENTION

I. Overview

Figure 1:
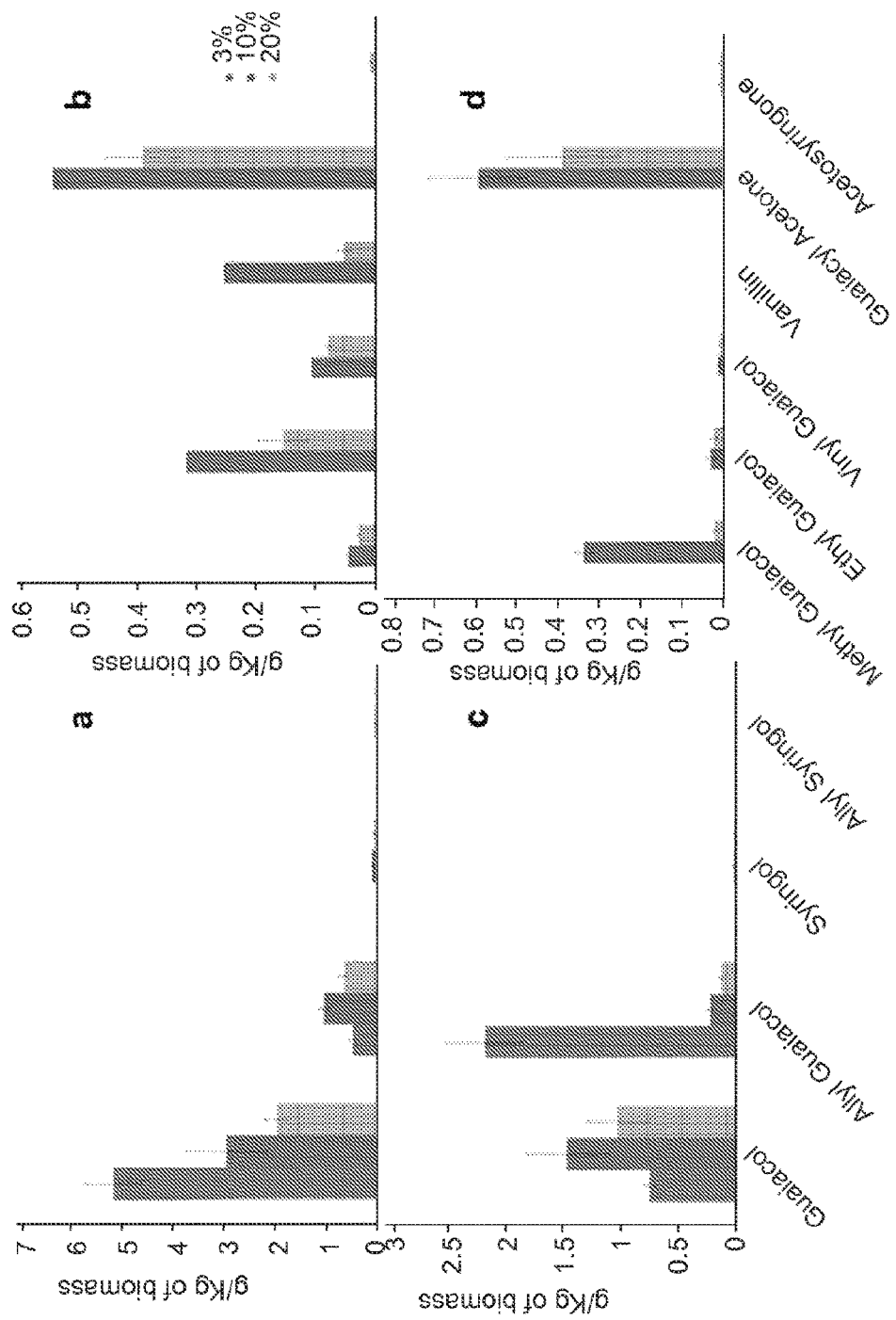
FIG. 1: depicts major and minor lignin breakdown products from kraft lignin (a & b) and low sulfonate alkali (c & d) lignin after dissolution at 160° C. for 6 hours with different biomass loading.

In one aspect, the invention provides a method for the production of lignin compounds from starting material comprising lignin, such as lignocellulose-containing biomass or polymeric lignin, where the method includes contacting, and depolymerizing the starting material with one or more ionic liquids. High-value lignin compounds can be extracted from biomass, such as lignocellulose-containing biomass, or from polymeric lignin produced as a byproduct of the paper and pulp industry. Processes of the present invention provide high-value lignin compounds. In some embodiments, the compounds provided by the methods of the present invention include aromatic lignin compounds such as phenols, guaicols, syringols, eugenol, conyferols, and catechols. In some embodiments, these feedstocks may be oxidized into other useful compounds such as vanillin, vanillic acid, syringaldehyde, and the like. In other embodiments, the feedstocks may be derivatized into useful compounds such as benzene and substituted benzenes, toluene, xylene, styrenes, biphenyls, cyclohexane, phenol and substituted phenols, and methoxy phenols and substituted methoxy phenols. These lignin compounds can be further derivatized to produce commercially useful chemicals and fuel or used directly. For example, chemicals and products produced or extracted from lignin by methods of the present invention include but are not limited to lignin fertilizers, lignin carbon fibers, pulping catalysts, DMSO, catechol, cresols, resorcinol, lignin rubber, lignin starch films, lignosulfonates, lignin thermosets, lignin binders, quinones, cyclohexane, lignin asphalt, lignin polyblend, cyclohexanol, arboform, and any of the aforementioned chemicals or compounds.

In some embodiments, the treatment process is carried out employing a lignocellulose biomass. For example, the lignocellulose may be treated in order to break the polymeric lignin seal and disrupt the crystalline structure of cellulose. Alternatively, polymeric lignin, obtained e.g. from the paper and pulp industry, is treated in accordance with the invention. In various embodiments, the biopolymers such as polymeric lignin, cellulose, or hemicellulose may be partially or completely depolymerized by this process, partially or completely derivatized by this process, or extracted by this process and depolymerized or derivatized by an additional chemical or enzymatic step. The lignin fraction may be recovered, e.g., by precipitation or liquid-liquid extraction. The ionic liquids may optionally be recovered as well, e.g., by distillation or liquid-liquid extraction.

The present invention provides an ionic liquid treatment process that has significant advantages over the presently used ionic liquid treatment processes. In the treatment process of the present invention, the lignocellulosic biomass or polymeric lignin is contacted with an ionic liquid for a time, and in a manner, sufficient to release and/or generate high-value lignin compounds. It has surprisingly been found that the methods of the present invention provide a low cost method for extraction of high-value and renewable lignin compounds.

II. Starting Material a. Biomass

As used herein, the phrase "biomass" refers to lignocellulosic materials comprised of lignin-containing any mix of cellulose, hemicelluloses, and lignin as the major constituents. In the context of this invention "lignocellulosic biomass" is used interchangeably with "cellulosic biomass". Both terms refer to biomass that comprise lignin. "Biomass" for use in the process of the present invention includes any biomass or mixtures thereof that contains lignin or lignocellulose. Lignocellulose-containing biomass primarily consists of cellulose, hemicelluloses, and lignin. Woody biomass, for instance, is about 45-50% cellulose, 20-25% hemicellulose and 20-25% lignin. Herbaceous materials have lower cellulose, lower lignin and higher hemicellulose contents.

Cellulose is a linear beta 1->4 linked polymer of glucose. It is the principal component of all higher plant cell walls. In nature, cellulose exists in crystalline and amorphous states. The thermodynamic stability of the beta 1->4 linkage and the capacity of cellulose to form internal hydrogen bonds gives it great structural strength. Cellulose is degraded to glucose through hydrolytic cleavage of the glycosidic bond.

Hemicellulose is a term used to refer to a wide variety of heteropolysaccharides found in association with cellulose and lignin in both woody and herbaceous plant species. The sugar composition varies with the plant species, but in angiosperms, the principal hemicellulosic sugar is xylose. Like cellulose, xylose occurs in the beta 1->4 linked backbone of the polymer. In gymnosperms, the principal component sugar is mannose. Arabinose is found as a side branch in some hemicelluloses.

Lignin is a phenylpropane polymer of monolignol monomers. It is generally found as an integral part of the secondary cell walls of plants and certain types of algae. There are three monolignol monomers, methoxylated to various degrees: p-coumaryl alcohol, coniferyl alcohol, and sinapyl alcohol. These lignols are incorporated into lignin in the form of the phenylpropanoids p-hydroxyphenyl (H), guaiacyl (G), and syringyl (S), respectively. Gymnosperms have a lignin that consists almost entirely of G with small quantities of H. That of dicotyledonous angiosperms is more often than not a mixture of G and S (with very little H), and monocotyledonous lignin is a mixture of all three. Many grasses have mostly G, while some palms have mainly S. All lignins contain small amounts of incomplete or modified monolignols, and other monomers are prominent in non-woody plants. Unlike cellulose and hemicellulose, lignin cannot be depolymerized by hydrolysis. Cleavage of the principal bonds in the lignin polymer generally proceeds through oxidation.

In one embodiment, the biomass is a lignocellulose-containing material (or, alternatively, lignocellulose biomass). In a preferred embodiment the lignocellulose-containing material contains at least 30 wt.-%, at least 50 wt.-%, at least 70 wt.-%, or at least 90 wt.-% lignocellulose. It will be understood by those of skill that the lignocellulose-containing material can also comprise other constituents, such as proteinaceous material, starchy material, and sugars, such as fermentable sugars and/or un-fermentable sugars.

Lignocellulose biomass is generally found, for example, in the stems, leaves, hulls, husks, and cobs of plants or leaves, branches, and wood of trees. Lignocellulose biomass can also be, but is not limited to, herbaceous material, agricultural residues, forestry residues, municipal solid wastes, waste paper, and pulp and paper mill residues. It is to be understood that lignocellulose biomass may be in the form of plant cell wall material containing lignin, cellulose and hemicellulose in a mixed matrix.

In a some embodiments, the lignocellulose biomass includes, but is not limited to, switchgrass, pine, eucalyptus, corn stover, corn fiber, hardwood, such as poplar and birch, softwood, cereal straw, such as, wheat straw, switch grass, Miscanthus, rice hulls, or mixtures thereof. Other examples include corn fiber, rice straw, wheat bran, pine wood, wood chips, poplar, bagasse, paper and pulp processing waste.

In some embodiments of the present invention, biomass is mechanically ground, chipped, cracked, fractured, steam-exploded, ammonia fiber expanded, separated, crushed, or pre-treated with hot water, $CO_2$, acid, or base, or a combination thereof prior to, during, or after contacting with ionic liquid.

a. Technical Lignin

In some embodiments of the present invention, methods and compositions are provided for obtaining high-value low molecular weight or monomeric lignin compounds from technical lignins. Technical lignins, or polymeric lignins, are most commonly derived as a byproduct of the paper and pulp industry. For example, kraft lignin may be obtained via the kraft process, lignosulfonates, may be produced, e.g. from the sulfite pulping process, alkali lignin, may be produced, e.g. from treating the black liquor from the soda process with acid, and low sulfonate alkali lignin may be obtained as a byproduct of wood pulping. It is understood by those in the art that the precise source for technical lignin is not critical for the methods of the present invention. Rather the methods of the present invention are suitable for deriving high-value low molecular weight or monomeric lignin compounds from a wide range of polymeric lignin sources.

In some embodiments of the present invention, polymeric lignin is mechanically ground, chipped, cracked, fractured, steam-exploded, ammonia fiber expanded, separated, crushed, or pre-treated with hot water, $CO_2$, acid, or base, or a combination thereof prior to, during, or after contacting with ionic liquid.

III. Treatment

The present invention provides a process for treating a biomass or polymeric lignin starting material, the process comprising: contacting the starting material with an ionic liquid, to form a composition comprising ionic liquid and starting material, for a time sufficient to treat the starting material. One of skill in the art will understand the length of time required to treat the starting material. Alternatively, one of skill in the art will know how to determine a sufficient time to treat the starting material. The length of time required to be sufficient may vary based on the composition or source of the starting material, the methods of the present invention utilized to treat the starting material, and the goal of the treatment process. In some embodiments, a sufficient time may be selected to partially or completely solubilize lignin or a useful fraction thereof, partially or completely depolymerize lignin or a useful fraction thereof, extract high-value compounds, derivatize or oxidize lignin, or a combination thereof. Starting material that has been treated for a sufficient time is herein referred to as treated material. In some embodiments of the present invention, starting material is contacted with ionic liquid for a time significantly longer than required for cellulose extraction from lignocellulosic biomass.

The contacting can comprise agitating or stirring (at, e.g., 200 to about 400 rpm) the starting material and the ionic liquid to ensure complete mixing of the two. Additionally, the agitating or stirring may be performed for a time sufficient to treat the starting material. Typically, the starting material is contacted with the ionic liquid for a period of time ranging from about 0.5 to about 12 hours. In one embodiment, starting material (e.g. biomass or polymeric lignin) is contacted with the ionic liquid for a period of time ranging from at least about 0.5 to at least about 24 hours. In another embodiment, starting material is contacted with the ionic liquid for at least about 1, 2, 3, 6, 8, 10, 12, 14, 16, 18, or 20 hours. In yet other embodiments, the starting material is contacted with ionic liquid for between about 1 to about 24 hours, between about 2 to about 18 hours, between about 3 to about 16 hours, between about 4 to about 12 hours, or between about 6 to 10 hours. In some cases, the contacting may be performed for any of the foregoing durations, or 0.5 hrs longer or shorter than said foregoing durations.

Typically, the contacting is at a temperature ranging from about 25° C. to about 200° C. In a preferred embodiment, the contacting is at a temperature ranging from about 100® C. to about 180° C., or at a temperature of about 120° C. or 160° C. In other embodiments, the contacting may be performed at a temperature of approximately 90, 100, 110, 120, 130, 140, 150, 160, 170, or 180° C. In some cases, the contacting may be performed at a temperature of at least about 90, 100, 110, 120, 130, 140, 150, 160, 170, or 180° C. For example, the contacting may be performed at a temperature of between about 100 to about 180° C., between about 110 to about 170° C., or between about 120 to about 160° C. In yet other embodiments, the contacting may be performed at any of the foregoing temperatures, or 5° C. above or below said foregoing temperatures.

Ionic liquids (ILs) are salts that are liquids rather than crystals at room temperatures. It will be readily apparent to those of skill that numerous ILs can be used in the treatment process of the present invention. In some embodiments of the invention, the IL is suitable for treatment of the starting material and for subsequent enzymatic or chemical processing. Suitable ILs are taught in ChemFiles (2006) 6(9) (which are commercially available from Sigma-Aldrich; Milwaukee, Wis.). Such suitable ILs include, but are not limited to, 1-alkyl-3-alkylimidazolium alkanate, 1-alkyl-3-alkylimidazolium alkylsulfate, 1-alkyl-3-alkylimidazolium methylsulfonate, 1-alkyl-3-alkylimidazolium hydrogensulfate, 1-alkyl-3-alkylimidazolium thiocyanate, and 1-alkyl-3-alkylimidazolium halide, wherein an "alkyl" is an alkyl group comprising from 1 to 10 carbon atoms, and an "alkanate" is an alkanate comprising from 1 to 10 carbon atoms. In some embodiments, the "alkyl" is an alkyl group comprising from 1 to 4 carbon atoms. In some embodiments, the "alkyl" is a methyl group, ethyl group or butyl group. In some embodiments, the "alkanate" is an alkanate comprising from 1 to 4 carbon atoms. In some embodiments, the "alkanate" is an acetate. In some embodiments, the halide is chloride.

In some embodiments, the IL includes, but is not limited to, 1-ethyl-3-methylimidazolium acetate (EMIM Acetate) or ([$C_2$mim][OAc]), 1-ethyl-3-methylimidazolium chloride (EMIM Cl), 1-ethyl-3-methylimidazolium hydrogensulfate (EMIM $HOSO_3$), 1-ethyl-3-methylimidazolium methylsulfate (EMIM $MeOSO_3$), 1-ethyl-3-methylimidazolium ethylsulfate (EMIM $EtOSO_3$), 1-ethyl-3-methylimidazolium methanesulfonate (EMIM $MeSO_3$), 1-ethyl-3-methylimidazolium tetrachloroaluminate (EMIM AlCl4), 1-ethyl-3-methylimidazolium thiocyanate (EMIM SCN), 1-butyl-3-methylimidazolium acetate (BMIM Acetate), 1-butyl-3-methylimidazolium chloride (BMIM Cl), 1-butyl-3-methylimidazolium hydrogensulfate (BMIM $HOSO_3$), 1-butyl-3-methylimidazolium methanesulfonate (BMIM $MeSO_3$), 1-butyl-3-methylimidazolium methylsulfate (BMIM $MeOSO_3$), 1-butyl-3-methylimidazolium tetrachloroaluminate (BMIM AlCl4), 1-butyl-3-methylimidazolium thiocyanate (BMIM SCN), 1-ethyl-2,3-dimethylimidazolium ethylsulfate (EDIM $EtOSO_3$), Tris(2-hydroxyethyl)methylammonium methylsulfate (MTEOA $MeOSO_3$), 1-methylimidazolium chloride (MIM Cl), 1-methylimidazolium hydrogensulfate (MIM $HOSO_3$), 1,2,4-trimethylpyrazolium methylsulfate, tributylmethylammonium methylsulfate, choline acetate, choline salicylate, and the like. The ionic liquid can comprise one or a mixture of the compounds. Additional ILs suitable for use in the present invention are taught in U.S. Pat. No. 6,177,575, which is herein incorporated by reference. It will be appreciated by those of skill in the art that other ionic liquids that will be useful in the process of the present invention are currently being developed or will be developed in the future, and the present invention contemplates their future use.

In some embodiments of the present invention, starting material is contacted with a water miscible ionic liquid. In other embodiments of the present invention, a water immiscible ionic liquid is employed. One of skill in the art can readily determine the water solubility of an ionic liquid empirically. In some cases, a water immiscible ionic liquid may be utilized to extract more non-polar compounds. In some cases, a water miscible ionic liquid may be utilized to be compatible with other processes such as recovery of cellulose and/or hemicellulose that is facile to enzymatic or chemical depolymerization via precipitation. Example water miscible ionic liquids include, but are not limited to, 1-ethyl-3-methylimidazolium acetate (EMIM Acetate) or ([$C_2$mim][OAc]), 1-ethyl-3-methylimidazolium chloride (EMIM Cl), 1-ethyl-3-methylimidazolium hydrogensulfate (EMIM $HOSO_3$), 1-ethyl-3-methylimidazolium methylsulfate (EMIM $MeOSO_3$), 1-ethyl-3-methylimidazolium ethylsulfate (EMIM $EtOSO_3$), 1-ethyl-3-methylimidazolium methanesulfonate (EMIM $MeSO_3$), 1-ethyl-3-methylimidazolium tetrachloroaluminate (EMIM AlCl4), 1-ethyl-3-methylimidazolium thiocyanate (EMIM SCN), 1-butyl-3-methylimidazolium acetate (BMIM Acetate), 1-butyl-3-methylimidazolium chloride (BMIM Cl), 1-butyl-3-methylimidazolium hydrogensulfate (BMIM $HOSO_3$), 1-butyl-3-methylimidazolium methanesulfonate (BMIM $MeSO_3$), 1-butyl-3-methylimidazolium methylsulfate (BMIM $MeOSO_3$), 1-butyl-3-methylimidazolium tetrachloroaluminate (BMIM AlCl4), 1-butyl-3-methylimidazolium thiocyanate (BMIM SCN), 1-ethyl-2,3-dimethylimidazolium ethylsulfate (EDIM $EtOSO_3$), Tris(2-hydroxyethyl)methylammonium methylsulfate (MTEOA $MeOSO_3$), 1-methylimidazolium chloride (MIM Cl), 1-methylimidazolium hydrogensulfate (MIM $HOSO_3$), 1,2,4-trimethylpyrazolium methylsulfate, tributylmethylammonium methylsulfate, choline acetate, choline salicylate, and the like. Example water immiscible ionic liquids include, but are not limited to: N-Butyl-3-methylpyridinium bis(trifluoromethylsulfonyl)imide, (BMPIm BTI), 1,2-Dimethyl-3-propylimidazolium bis(trifluoromethylsulfonyl)imide, (DMPIIm BTI), 1,2-Dimethyl-3-propylimidazolium tris(trifluoromethylsulfonyl)methide, (DMPIMe TTI), 1-Ethyl-3-methylimidazolium bis(pentafluoroethylsulfonyl)imide, (EMIBeti BPI), 1-Ethyl-3-methylimidazolium bis(trifluoromethylsulfonyl)imide, (EMIIm BTI), N-Propyl-3-methylpyridinium bis(trifluoromethylsulfonyl)imide, (PMPIm BTI), and the like.

The ionic liquid (IL) may be of a concentration of more than 0%/and up to 100% of the composition or solution containing starting material. In some embodiments, the starting material is mixed with ionic liquid, and the ionic liquid is of a concentration of more than 70% and up to 100% of the composition or solution, more than 80% and up to 100%, or more than 90% and up to 100%. The upper range of the concentration of IL in a composition containing starting material may be equal to or less than 100%, equal to or less than 90%, equal to or less than 80%, equal to or less than 70%, equal to or less than 60%, or equal to or less than 55%. In other embodiments, the IL in a composition containing starting material may be of a concentration of more than 0% to less than 60% of the composition or solution. In some embodiments, the concentration of IL in a composition containing starting material is equal to or more than 90%, equal to or more than 91%, equal to or more than 93%, or equal to or more than 94%, 95%, 96%, 97%, 98%, 99%, 99.5%, or 99.9%. In other embodiments, the concentration of IL in a composition containing starting material is equal to or more than 1%, 2%, 3%, 4%, 5%, 10%, 15%, 20%, 30%, 40%, 50%, 60%, 75%, 80%, or 90%.

In some embodiments of the invention, a co-solvent is used. Advantageously, the use of co-solvents may reduce the IL requirements, which may help increase the economic viability of this treatment process. In addition, the use of co-solvents may reduce the viscosity of the starting material-IL-co-solvent mixture, thereby increasing loading (i.e., the proportion of starting material used in a given volume of IL). As such, in one embodiment, the starting material is contacted with the ionic liquid and a co-solvent for a time sufficient to treat the starting material. Suitable co-solvents include, but are not limited to water, acetone, propylene carbonate, isopropyl alcohol, ethanol, dimethyl sulfoxide (DMSO), and the like. Typically, the ionic liquid:co-solvent mixture is about 20%:80% to about 80%:20%.

It will be apparent to those of skill in the art that the solution containing the IL can further comprise NaCl or other mineral salt, such as up to 10 mM of NaCl, LiCl, $CaCl_2$ or $MgCl_2$. In addition, the solution can further comprise a suitable buffer and other additives that are beneficial to the treatment process.

Once the contacting step is complete, a portion of the starting or treated material can be reconstituted. In one embodiment, the treated material is reconstituted using a precipitant (or an anti-solvent). Advantageously, the use of a precipitant may facilitate recovery of IL, treated material, starting material, reconstituted biomass, and/or lignin compounds including high-value low molecular weight or monomeric aromatic or non-polar lignin compounds, which may help increase the economic viability of this treatment process. In some embodiments, the precipitant is water, methanol, ethanol, propanol, butanol, pentanol, hexanol, heptanol, or octanol. The ionic liquid may then be separated from the treated material, further extracted, and recycled using standard liquid-solid separation techniques. The solid treated material residue may then be washed to ensure substantial removal of the ionic liquid, and the solid treated material may be subjected to downstream processes, including but not limited to, enzymatic hydrolysis and then fermentation using procedures known to and used by those of skill in the art.

Alternatively, precipitation may not be performed. For example, in some methods of the present invention, a technical lignin is contacted with an ionic liquid, and no precipitation is performed. In other methods of the present invention, a biomass is contacted with an ionic liquid and no precipitation is performed. In some cases, precipitation may be avoided if recovery of cellulose or hemicellulose is not desired. In other cases, cellulose or hemicellulose recovery may be performed by some other means known in the art.

In some embodiments of the invention, an extractant is utilized for liquid-liquid extraction of a desired compound or composition from the composition containing IL that has been contacted with starting material. Advantageously, the use of an extractant may facilitate recovery of IL, treated material, starting material, reconstituted biomass, lignin compounds including low molecular weight or monomeric aromatic or non-polar lignin compounds, or a combination thereof, which may help increase the economic viability of this treatment process. As such, in one embodiment, the composition containing ionic liquid and starting or treated material is contacted with an extractant. Suitable extractants include, but are not limited to water, methanol, ethanol, propanol, butanol, pentanol, hexanol, heptanol, octanol, benzene, toluene, acetone, pentane, hexane, heptane, octane, isooctane, a second IL, or other suitable solvents. In some embodiments, the extractant is a non-polar solvent. Those of skill in the art understand that the suitability of a solvent extractant for liquid-liquid extraction from an IL will vary based on a number of factors including but not limited to the initial IL utilized, the relative hydrophobicity or polarity of the compounds to be extracted, and the pH at which the extraction is to be performed. In one embodiment, benzene, hexane, or pentane is used to extract low molecular weight or monomeric lignin compounds, e.g., relatively non-polar lignin compounds from a composition containing IL and treated material. In another embodiment, benzene, hexane, or pentane is used to extract lignin compounds from a composition comprising the IL [$C_2$mim][OAc]. Typically, the ionic liquid:extractant mixture is from about 10%:90% to about 90%: 10% of IL:extractant. In some embodiments, the mixture is about 50%:50% of IL:extractant. In other embodiments, the mixture is from about 20%-80% to about 80%-20% IL:extractant. In other embodiments, the extractant comprises about 1%, 3%, 5%, 7.5%, 10%, 12%, 15%, 20%, 25%, 30%, or 40% of the IL:extractant composition. In yet other embodiments, the extractant comprises about 60%, 65%, 70%, 75%, 80%, 85%, 90%, 95%, or 99% of the IL:extractant composition. One of skill in the art knows how to select a suitable proportion of IL:extractant.

IV. Purification

In some embodiments of the present invention, low molecular weight or monomeric lignin compounds may be further purified after liquid-liquid extraction. For example, extractant may be evaporated or distilled from the lignin compounds. Alternatively, extractant may be removed by the use of a suitable column, such as a reverse phase column, a size exclusion column, or an ion exchange column.

V. Examples

Example I

I.1. Materials

Kraft lignin was supplied from MeadWestvaco Corp., Richmond, Va. and low sulfonate alkali lignin was purchased from Sigma Aldrich. 1-ethyl-3-methyl imidazolium acetate ([$C_2$mim][OAc], 98%) was used as the solvent to depolymerize and dissolve lignin from the biomass. Benzene was used as the extraction solvent. Guaiacol, ethyl guaiacol, vinyl guaiacol, vanillin, eugenol, syringol, 4-allyl syringol, guaiacyl acetone and 2-methoxy, 4-propenyl phenol were used as standards to confirm the position and the mass to charge ratio of the Gas Chromatography/Mass Spectrometry (GC/MS) peaks. All the chemicals used in this study were purchased from Sigma Aldrich.

I.2 Lignin Dissolution

Technical lignins were dissolved in [$C_2$mim][OAc] at two different temperatures 160 and 120° C. in a conventional oven (Thelco Laboratory Oven, Jouan Inc, Virginia) for 1, 3, 6 and 12 hrs. Solid loading was held constant at 3 wt % (300 mg in 9.7 mL of [$C_2$mim][OAc]) and components were mixed at room temperature before being placed in the oven. 35 ml of hot water was added to the above sample to precipitate the dissolved material. The mixture of [$C_2$mim][OAc], water and precipitant was centrifuged to separate the solid (precipitant) and liquid ([$C_2$mim][OAc], water, and dissolved lignin products). The total precipitant recovered after pretreatment and the lignin content in the recovered precipitant is shown in Table 1. This mixture of [$C_2$mim][OAc] and water will be referred to as the supernatant for the rest of this report. Estimation (based on mass balance) of the amount of lignin left in the supernatant after dissolution for 6 hrs has also been shown in Table 1.

I.3 Lignin Extraction from the Supernatant

A total of 10 ml of benzene was added to the supernatant in two steps. The sample mixture (benzene+sample) was mixed thoroughly and was then phase separated using a centrifuge. This allowed for all the non-polar compounds to be extracted from the supernatant to the benzene phase. This benzene solution was further concentrated under nitrogen to a final volume of 1 ml. This solution was then subjected to the GC-MS analysis.

I.4 Gas Chromatography-Mass Spectrometry

Analysis of the lignin breakdown compounds was performed using a GC-MS (Thermo Electron Corporation with Trace GC Ultra, Polaris-Q MS and TriPlus auto sampler).

The compounds were separated using a TR-SMS (30 m, 0.25 mm ID, 0.25 μm) chromatographic column. 10 μl of the sample was injected into the GC at an inlet temperature of 220° C. and was operated in a split mode (split flow of 12 ml/min, split ratio=10). Helium was used as a carrier gas with a constant flow rate of 1.2 ml/min. The temperature of the GC was held at 45° C. for 1 min, was then increased at a rate 10° C./min up to 300° C. and was held at this temperature for 1 min. The MS was used until the end of GC run with a solvent delay of 3.5 min. The ion source was maintained at a temperature of 250° C. and the MS was operated in scan mode.

I.5 Results

The weight of the technical lignin recovered after IL dissolution is shown in Table 1. The amount of recovered solids is lower than the amount of the starting material (Table 1), indicating that lignin and other constituents remained in the supernatant. Various lignin breakdown products extracted from the supernatant, along with their elution time in GC-MS, are shown in Table 2. The lignin breakdown products depend on the starting material and the dissolution temperature. The lignin monomeric products mainly composed of methoxy-phenols and substituted methoxy-phenols. Guaiacol was the common product for the technical lignins.

TABLE 1

Biomass recovered after pretreatment and the lignin content of the biomass as a function of pretreatment temperature

| Biomass | Pretreatment Temperature | % Recovered | % Lignin Content | Lignin in Supernatant (mg)* |
|---|---|---|---|---|
| Kraft Lignin | 120° C. | 63 ± 5 | 100 | 44.4 |
| | 160° C. | 60 ± 2 | 100 | 48 |
| LS | 120° C. | 29 ± 6 | 100 | 85.2 |
| | 160° C. | 33 ± 1 | 100 | 80.4 |

*Calculated based on the lignin content of the untreated and recovered biomass

TABLE 2

Non-Polar Lignin breakdown products found in the benzene extract of the supernatant

| | Name | Compound | RT |
|---|---|---|---|
| 1 | Guaiacol | [structure] | 8.8 |
| 2 | 4-Ethyl Guaiacol | [structure] | 10.4 |
| 3 | 4-Vinyl Guaiacol | [structure] | 11.1 |
| 4 | Eugenol | [structure] | 11.61 |
| 5 | Syringol | [structure] | 12.03 |
| 6 | 4-(1-propenyl) Guaiacol | [structure] | 12.97 |
| 7 | Vanillin | [structure] | 13.54 |
| 8 | Allyl Syringol | [structure] | 14.49 |
| 9 | Guaiacylacetone | [structure] | 14.14 |
| 10 | Anthracene-$d_{10}$ | [structure] | 16.97 |

I.5.1 Lignin Products from Technical Lignins

For the technical lignins, vanillin is the major product observed at 120° C. 4-(1-propenyl) guaiacol from low sulfonate alkali lignin and, guaiacol and ethyl guaiacol from kraft lignin are also produced after dissolution in [C₂mim][OAc] at 120° C. On dissolution at 160° C., eugenol followed by guaiacol and 4-(1-propenyl) guaiacol are the major product from low sulfonate lignin. Kraft lignin dissolved at 160° C. produced guaiacol (major product), eugenol and 4-(1-propenyl) guaiacol. As these technical lignins were derived from softwood and do not contain any S-lignin in the original polymer, syringyl compounds were not produced on dissolution of these technical lignins.

The absence of guaiacylacetone and aldehyde derivatives (coniferaldehyde) and the presence of eugenol and 4-(1-propenyl) guaiacol in the supernatant suggests incomplete oxidation of aldehydes in [C₂mim][OAc] at these dissolution temperatures. These findings suggest that dissolution in [C₂mim][OAc] behaves similar to alkali pretreatment at lower temperature (e.g., 120° C.) and acid pretreatment at higher temperatures (e.g., 160° C.).

Example II

II.1. Materials

Switchgrass (*Panicum virgatum*, cultivar MPV2) was provided by the laboratory of Dr. Ken Vogel. *Pinus radiata* and *Eucalyptus globulus* was provided by Arborgen. 1-ethyl-3-methyl imidazolium acetate ([C₂mim][OAc], 98%) was used as the solvent to depolymerize and dissolve lignin from the biomass. Benzene was used as the extraction solvent. Guaiacol, ethyl guaiacol, vinyl guaiacol, vanillin, eugenol, syringol, 4-allyl syringol, guaiacyl acetone and 2-methoxy, 4-propenyl phenol were used as standards to confirm the position and the mass to charge ratio of the Gas Chromatography/Mass Spectrometry (GC/MS) peaks. All the chemicals used in this study were purchased from Sigma Aldrich.

II.2. Lignin Dissolution

Biomass was ground to 40 mesh before the dissolution process (Thomas-Wiley Mini Mill fitted with a 40-mesh screen; Model 3383-L10 Arthur H. Thomas Co., Philadelphia, Pa., USA). Biomass was dissolved in [C₂mim][OAc] at two different temperatures 160 and 120° C. in a conventional oven (Thelco Laboratory Oven, Jouan Inc, Virginia) for 1, 3, 6 and 12 hrs. Solid loading was held constant at 3 wt % (300 mg in 9.7 mL of [C₂mim][OAc]) and components were mixed at room temperature before being placed in the oven. 35 ml of hot water was added to the above sample to precipitate the dissolved biomass. The mixture of [C₂mim][OAc], water and biomass was centrifuged to separate the solid (recovered biomass) and the supernatant ([C₂mim][OAc] and water). The total biomass recovered after pretreatment and the lignin content in the recovered solids is shown in Table 3. Estimation (based on mass balance) of the amount of lignin left in the supernatant after dissolution for 6 hrs is also shown in Table 3.

II.3. Lignin Extraction from the Supernatant

A total of 10 ml of benzene was added to the supernatant in two steps. The sample mixture (benzene+sample) was mixed thoroughly and was then phase separated using a centrifuge. This allowed for all the non-polar compounds to be extracted from the supernatant to the benzene phase. This benzene solution was further concentrated under nitrogen to a final volume of 1 ml. This solution was then subjected to the GC-MS analysis.

II.4. Gas Chromatography-Mass Spectrometry

Analysis of the lignin breakdown compounds was performed using a GC-MS (Thermo Electron Corporation with Trace GC Ultra, Polaris-Q MS and TriPlus auto sampler). The compounds were separated using a TR-SMS (30 m, 0.25 mm ID, 0.25 μm) chromatographic column. 10 μl of the sample was injected into the GC at an inlet temperature of 220° C. and was operated in a split mode (split flow of 12 ml/min, split ratio=10). Helium was used as a carrier gas with a constant flow rate of 1.2 ml/min. The temperature of the GC was held at 45° C. for 1 min, was then increased at a rate 10° C./min up to 300° C. and was held at this temperature for 1 min. The MS was used until the end of GC run with a solvent delay of 3.5 min. The ion source was maintained at a temperature of 250° C. and the MS was operated in scan mode.

II.5 Results

The weight of the biomass recovered after IL dissolution is shown in Table 3. The amount of recovered solids is lower than the amount of the starting material (Table 3), indicating that lignin and other biomass constituents remained in the supernatant. Various lignin breakdown products extracted from the supernatant, along with their elution time in GC-MS, are shown in Table 4. The lignin breakdown products depend on the biomass and the dissolution temperature. The lignin monomeric products mainly composed of methoxy-phenols and substituted methoxy-phenols. Guaiacol was the common product for both the biomass treated in this Example, and the technical lignins treated in Example 1.

TABLE 3

Biomass recovered after pretreatment and the lignin content of the biomass as a function of pretreatment temperature

| Biomass | Pretreatment Temperature | % Recovered | % Lignin Content | Lignin in Supernatant (mg)* |
|---|---|---|---|---|
| Switchgrass | Untreated | — | 33.2 | — |
|  | 120° C. | 65 ± 3 | 22 ± 3 | 56.7 |
|  | 160° C. | 40 ± 0.3 | 16 ± 1 | 80.4 |
| Pine Dust | Untreated | — | 30 | — |
|  | 120° C. | 90 ± 1 | 18 ± 1 | 41.4 |
|  | 160° C. | 78 ± 5 | 32 ± 2 | 15.12 |
| Eucalyptus | Untreated | — | 39.5 | — |
|  | 120° C. | 82 ± 1 | 27 ± 4 | 52.08 |
|  | 160° C. | 64 ± 1 | 48 ± 2 | 83.94 |

*Calculated based on the lignin content of the untreated and recovered biomass

TABLE 4

Non-Polar Lignin breakdown products found in the benzene extract of the supernatant

| | Name | Compound | RT |
|---|---|---|---|
| 1 | Guaiacol | 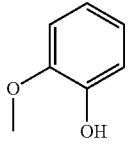 | 8.8 |
| 2 | 4-Ethyl Guaiacol | 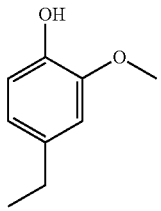 | 10.4 |

TABLE 4-continued

Non-Polar Lignin breakdown products found in the benzene extract of the supernatant

| # | Name | Compound | RT |
|---|---|---|---|
| 3 | 4-Vinyl Guaiacol | | 11.1 |
| 4 | Eugenol | | 11.61 |
| 5 | Syringol | | 12.03 |
| 6 | 4-(1-propenyl) Guaiacol | | 12.97 |
| 7 | Vanillin | | 13.54 |
| 8 | Allyl Syringol | | 14.49 |
| 9 | Guaiacylacetone | | 14.14 |
| 10 | Anthracene-$d_{10}$ | | 16.97 |

II.5.1 Lignin Breakdown Products from Biomass

Dissolution of switchgrass in [$C_2$mim][OAc] at 120° C. produced vinyl guaiacol and a small quantity of guaiacylacetone. Guaiacylacetone is the only product produced on dissolution of pine at 120° C. No lignin breakdown products from eucalyptus on dissolution at 120'C were observed. This may indicate lower dissolution of eucalyptus in [$C_2$mim][OAc] at 120° C. Guaiacol was the major product produced from all the lignocellulosics (switchgrass, pine and eucalyptus) after dissolution in [$C_2$mim][OAc] at 160° C. Dissolution of switchgrass at 160° C. also produced 4-(1-propenyl) guaiacol, syringol and guaiacylacetone. Due to the absence of S-lignin units in pine no syringyl-type of compounds were observed in the supernatant from pine. 4-(1-propenyl) guaiacol and guaiacylacetone were also produced from pine after dissolution at 160° C. S-type compounds of lignin products like syringol and allyl syringol along with 4-(1-propenyl) guaiacol on were observed after dissolution of eucalyptus at 160° C.

Presence of vinyl guaiacol in the supernatant produced from switchgrass pretreated at 120° C. indicates that alkaline conditions may be produced in [$C_2$mim][OAc] at this dissolution temperature. Guaiacylacetone is the major product produced from pine after dissolution at 120° C. This suggests that some of the treatment methods of the present invention result in acidic conditions. Formation of guaiacol and syringol at 160° C. indicates that high temperature (160° C.) [$C_2$mim][OAc] has acidic conditions. Similar to the case of technical lignins, formation of allyl guaial and allyl syringol from lignocellulosics at these treatment conditions may be due to incomplete oxidation.

II.6 Conclusions

In these Examples, [$C_2$mim][OAc] was used to produce monomeric aromatic compounds from two types of technical lignins and three types of lignocellulosics. Many G-monomers were present in the supernatant of technical lignins and biomasses after dissolution in [$C_2$mim][OAc] at 120 and 160° C. Guaiacol was the common product from both technical lignins and biomass, and was mostly produced at 160° C. S-monomers were present after dissolution of eucalyptus at 160° C. The results suggest the presence of acidic conditions in [$C_2$mim][OAc] at high dissolution temperatures. The reaction mechanisms and the conditions at 120° C. may be dependent on the biomass. This technology paves the path for the utilization of the lignin that is present in lignocellulosic biomass to produce lignin-derived chemicals. The products reported in this work only represent the non-polar monomeric components that were soluble in benzene. However, polar lignin products may be present in the supernatant and may be extracted.

Alternatively a different extractant, other than benzene, may be utilized to obtain polar lignin products.

Example III

III.1. Materials

Kraft lignin was supplied from MeadWestvaco Corp., Richmond, Va. Low sulfonate alkali lignin was purchased from Sigma Aldrich. Switchgrass (*Panicum virgatum*, cultivar MPV2) was provided by the laboratory of Dr. Ken Vogel. Samples of *Pinus radiata* and *Eucalyptus globulus* were provided by Arborgen. 1-ethyl-3-methylimidazolium acetate ([C2mim][OAc], 98% purity) was used as the solvent to depolymerize and dissolve lignin from the biomass. Benzene was used as the extraction solvent. Guaiacol, ethyl guaiacol, vinyl guaiacol, vanillin, eugenol, syringol. 4-allyl syringol, guaiacyl acetone and 2-methoxy, 4-propenyl phenol were used as standards to confirm the position and the mass to charge ratio of the Gas Chromatography/Mass Spectrometry (GC/MS) peaks. All other chemicals used in this study were purchased from Sigma Aldrich and used as received.

III.2. Lignin Dissolution in IL

Samples were ground to 40 mesh before the dissolution process (Thomas-Wiley Mini Mill fitted with a 40-mesh screen; Model 3383-L10 Arthur H. Thomas Co., Philadelphia, Pa., USA). Technical lignins and biomass were dissolved in [$C_2$mim][OAc] at 120 and 160° C. in a conventional oven (Thelco Laboratory Oven, Jouan Inc, Virginia) for 6 hrs. Solid loading was varied from 3 wt % (300 mg in 9.7 mL of [$C_2$mim][OAc]) to 10 wt % and 20 wt %, and components were mixed at room temperature before being placed in the oven. To this mixture 10 μL of anthracene-$D_{10}$ was added as internal standard (IS), for quantification in GC/MS analysis. 35 mL of hot water (95° C.) was added to the sample to precipitate the dissolved biomass (mostly glucans, unsolubilized lignin). The mixture of [$C_2$mim][OAc], water, and biomass was then centrifuged to separate the solid (recovered biomass) and liquid ([$C_2$mim][OAc] and water). This mixture of [$C_2$mim][OAc] and water will be referred to as the supernatant for the rest of this report. After the collection of supernatant, the biomass was further washed ten times with 100 ml of water (10 ml/wash).

III.3. Lignin Extraction from the Supernatant

A total of 10 mL of benzene was added to the supernatant in two steps. The resultant mixture (benzene+sample) was mixed thoroughly and was then phase separated using a centrifuge. This allowed for all the non-polar compounds to be extracted from the supernatant to the benzene phase. This benzene solution was further concentrated under nitrogen to a final volume of 1 ml.

III.4. Gas Chromatography-Mass Spectrometry (GC-MS)

The analysis of the lignin breakdown compounds present after benzene recovery was performed using a GC-MS (Thermo Electron Corporation with Trace GC Ultra, Polaris-Q MS and TriPlus auto sampler). The compounds were separated using a TR-SMS (30 m, 0.25 mm ID, 0.25 μm) chromatographic column. 10 μl of the sample was injected into the GC at an inlet temperature of 220° C. and was operated in a split mode (split flow of 12 mL/min, split ratio=10). Helium was used as a carrier gas with a constant flow rate of 1.2 mL/min. The temperature of the GC was held at 45° C. for 1 min, was then increased at a rate 10° C./min up to 300° C. and was held at this temperature for 1 min. The MS was used until the end of GC run with a solvent delay of 3.5 min. The ion source was maintained at a temperature of 250° C. and the MS was operated in scan mode. Anthracene-d10 was used as the internal standard as it is not present in the biomass samples. The standards of each compound were used to calculate the individual response factor.

III.5. Quantification: Calculation of Product Yield

Single-point calibration was used to calculate the response factor of the eluted compounds with respect to the internal standard (IS). Standards containing 2 mM of the compound and 20 μg of IS in 1 ml of Benzene were used for calibration. The area under the spectral peak of the compound and the IS were used to calculate the response factor (RF) (equation 1).

$$RF = \frac{Area_{compound}/\text{weight of the compound injected}}{Area_{IS}/\text{weight of } IS \text{ injected}} \quad (1)$$

The response factor was then used to calculate the actual concentration of the compounds in the sample. Area under the spectral peak of the compound and the IS for an actual sample are used to calculate the concentration of the compound in the injected volume of the sample.

$$\text{Weight of the compound in the injected sample} = \frac{Area_{compound}}{Area_{IS}} \times \frac{\text{Weight of } IS}{RF} \quad (2)$$

RFs were determined independently for each standard using GC/Ms. The amount of each product was calculated as $$\frac{\text{Amount of Product } A \text{ in the Supernatant (g)}}{\text{Amount of the Starting Biomass (Kg)}} \quad (3)$$

III.6. Results and Discussion

III.6.1 Extraction of Lignin Byproducts from IL Pretreatment Using [C2mim][OAc]

Measured amounts of three different biomass types representing grasses, softwood and hardwood (switchgrass, pine, and eucalyptus respectively) and technical lignins (kraft and low sulfonate alkali) were treated with [$C_2$mim][OAc] at 160 and 120° C. for 6 hrs. Extraction solvents for non-polar products included pentane, hexane, heptane and benzene. Out of the solvents tried, benzene enabled the most recovery. Although yields were not the same using different solvents, patterns of lignin degradation and recovery were similar for all the solvents tested. Table 5 shows the percent biomass recovered for various types of biomass pretreated at 160° C. under different loading conditions. For all the conditions studied there is a loss of mass observed, indicating that a portion of lignin and other biomass constituents remain solubilized in the supernatant. At low biomass loading levels, low sulfonate alkali lignin showed the maximum solubilization, followed with switchgrass. Percent recoveries were found to be similar for kraft lignin and eucalyptus. Interestingly, at higher loadings, the extent of solubilization was found to vary and the observed extent of solubilization at 20% loadings were switchgrass=eucalyptus>pine dust=low sulfonate alkali>kraft lignin. In addition, similar extent of mass solubilization from technical lignin and lignocellulosic biomass indicates high levels of impurities (other material than lignin) present in the technical lignins we used.

TABLE 5

Percent biomass recovered as a function of biomass loading during dissolution

| Biomass | Pretreatment Temperature | % Recovered |
|---|---|---|
| Kraft Lignin | 3% | 60 ± 2 |
|  | 10% | 69 ± 7 |
|  | 20% | 84 ± 4 |
| Low Sulfonate Alkali Lignin | 3% | 33 ± 1 |
|  | 10% | 43 ± 1 |
|  | 20% | 45 ± 3 |
| Switchgrass | Untreated | — |
|  | 3% | 40 ± 1 |
|  | 10% | 41 ± 4 |
|  | 20% | 35 ± 1 |

TABLE 5-continued

Percent biomass recovered as a function of biomass loading during dissolution

| Biomass | Pretreatment Temperature | % Recovered |
|---|---|---|
| Pine Dust | Untreated | — |
| | 3% | 78 ± 5 |
| | 10% | 56 ± 1 |
| | 20% | 44 ± 5 |
| Eucalyptus | Untreated | — |
| | 3% | 64 ± 1 |
| | 10% | 58 ± 1 |
| | 20% | 36 ± 1 |

III.6.2 Lignin Breakdown Products from Technical Lignins

The non-polar lignin breakdown products extracted from the supernatant, along with their elution times during GC-MS, are shown in Table 6. The lignin breakdown products are observed to depend on the sample type and the dissolution temperature. For the technical lignins studied, guaiacol and allyl guaiacol were the major products at all biomass loadings (FIG. 1). Higher quantities of guaiacol (5 g/kg of biomass) were produced from kraft lignin when compared to low sulfonate alkali lignin. The quantity of guaiacol produced (per kg of starting material) decreases as a function of increasing biomass loading. Higher quantities of ally guaiacol are produced from low sulfonate alkali lignin (2 g/kg) than from kraft lignin (1 g/kg). Other products like methyl guaiacol, ethyl guaiacol, vinyl guaiacol, vanillin, guaiacyl acetone are also present at smaller concentrations. Production of these minor products is observed to increase with increases in biomass loading from 3 wt % to 10 wt %, but is observed to decrease on further increasing the biomass loading to 20 wt %. Similar quantities of guaiacyl acetone are produced on dissolution of both kraft lignin and low sulfonate alkali lignin. Higher quantities of ethyl guaiacol, vinyl guaiacol and vanillin were produced from kraft lignin, whereas a higher quantity of methyl guaicol was obtained from low sulfonate alkali lignin. As these technical lignins were derived from softwood and contain very small quantities of S-lignin in the original feedstocks, syringyl compounds were not significant. Similar compounds were observed by Stärk et al. from the oxidative depolymerization of beech lignin and by Reichert et al., on electrolysis oxidative cleavage of alkali lignin. Stärk et al., ChemSusChem 2010, 3:719-23; Reichert et al., Phys Chem Chem Phys 2012, 14:5214-21.

TABLE 6

Non-Polar Lignin breakdown products found in the benzene extract of the supernatant

| | Name | Compound | RT |
|---|---|---|---|
| 1 | Guaiacol | 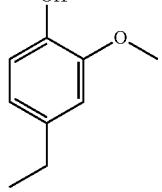 | 8.8 |
| 2 | 4-Ethyl Guaiacol | 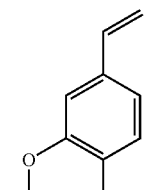 | 10.4 |
| 3 | 4-Vinyl Guaiacol | 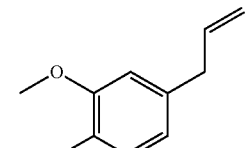 | 11.1 |
| 4 | Eugenol | 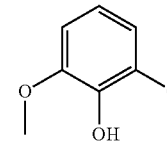 | 11.61 |
| 5 | Syringol | 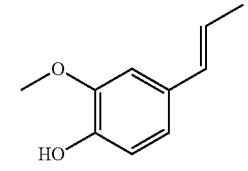 | 12.03 |
| 6 | 4-(1-propenyl) Guaiacol | 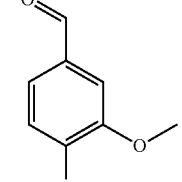 | 12.97 |
| 7 | Vanillin | 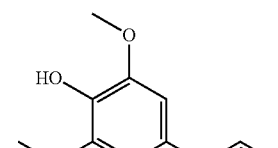 | 13.54 |
| 8 | Allyl Syringol | 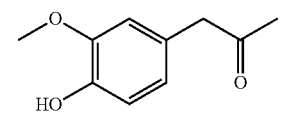 | 14.49 |
| 9 | Guaiacylacetone | 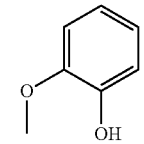 | 14.14 |

TABLE 6-continued

Non-Polar Lignin breakdown products found in the benzene extract of the supernatant

| | Name | Compound | RT |
|---|---|---|---|
| 10 | Anthracene-$d_{10}$ | (deuterated anthracene structure) | 16.97 |

The acidic or basic dissolution conditions that may be involved during the dissolution of lignin in IL can be predicted based on the products formed after dissolution. Vanillin has been previously produced from alkaline treatment and nitrobenzene oxidation of kraft lignin. Adler et al. show the formation of guaiacol as a result of acidolysis of guaiacylglycerol-β-guaiacyl ether (Adler et al., Advances in Chemistry. ACS, 1966:22-35). They show that the guaiacol is the main product due to the cleavage of β-aryl ether linkages. Adler et al. also predict guaiacylacetone to be one of the products of lignin acidolysis, but this monomer was present in small quantities in our supernatant solutions. Formation of aldehyde derivatives (coniferaldehyde) like allyl guaiacol during acid pretreatment of lignin is well cited in the literature. Presence of higher quantities of guaiacol and allyl guaiacol indicated acidic dissolution conditions in IL under these conditions. The products identified here strongly confirm the dual acidic and basic behavior of [$C_2$mim][OAc].

III.6.3 Lignin Breakdown Products from Switchgrass

Figure 2:
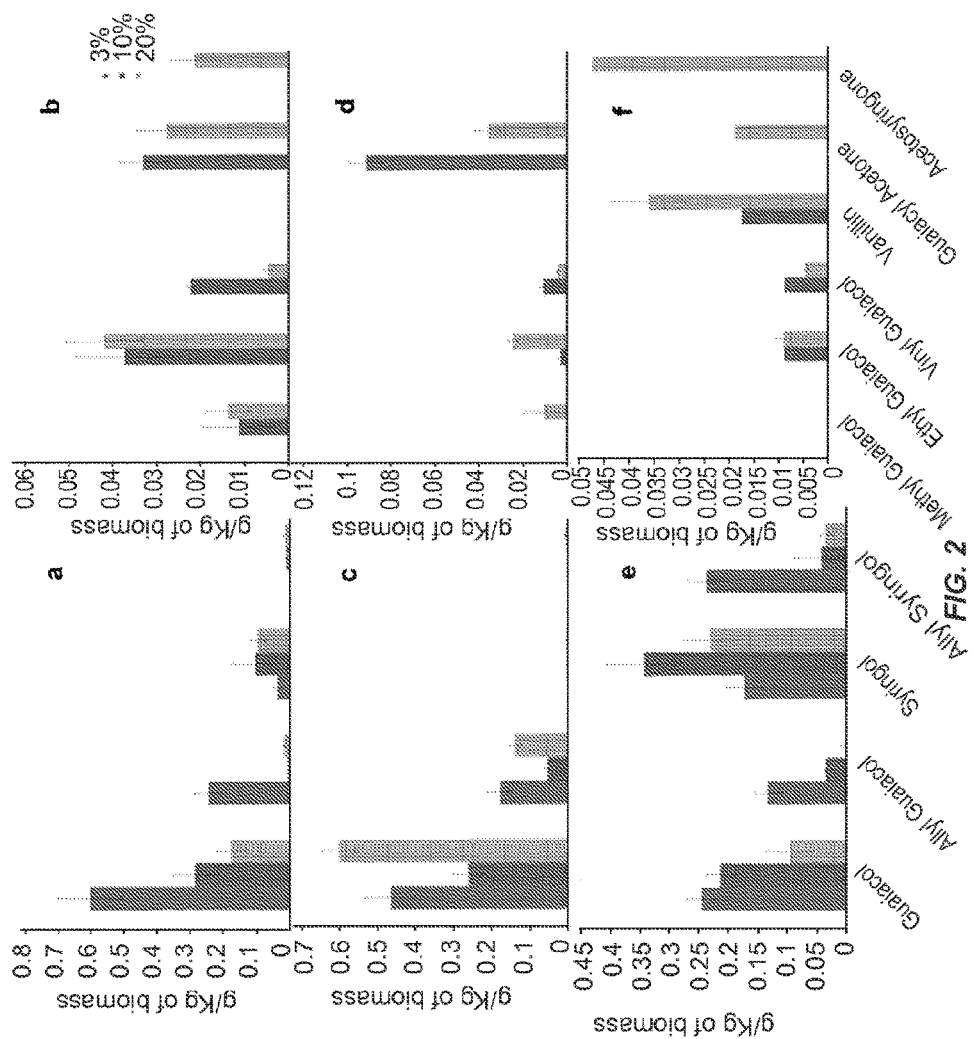
FIG. 2: depicts major and minor lignin breakdown products from switchgrass (a & b), pine (c & d), and eucalyptus (e & f) after dissolution at 160° C. for 6 hours with different biomass loading.

The total amount of byproducts produced from lignocellulosic biomass was observed to be lower than that produced from technical lignins. This is reasonable given that lignin constitutes only ~⅓ of the dry weight of biomass. Guaiacol was obtained on dissolution of all lignocellulosic biomass in [$C_2$mim][OAc] at 160° C. for 6 hrs (FIG. 2). Allyl guaiacol and syringol are also produced by dissolution of switchgrass (FIG. 2a). As in the case of kraft lignin, the amount of guaiacol and allyl guaiacol produced decrease with increase in biomass loading. The production of syringol-type lignin compounds like syringol, allyl syringol and aceto syringone increases with increase in biomass loading. This increase implies breakdown of syringyl lignin increases with increase in biomass loading. All the minor products (methyl guaiacol, ethyl guaiacol, vinyl guaiacol, guaiacyl acetone and acetosyringone) except vanillin are produced on dissolution of switchgrass (FIG. 2b), and the amount of these products increases with biomass loading. The increase in production of these minor compounds and decrease in production of major compounds indicates incomplete breakdown of lignin with increase in biomass loading.

III.6.4 Lignin Breakdown Products from Pine

Guaiacol and allyl guaiacol were the only major products from dissolution of pine (FIG. 2c). This is expected as pine consists of mostly guaiacyl lignin and has low (or no) syringyl lignin. In the case of pine, no correlation between the biomass loading and the total amount of guaiacol released was observed. The quantity of guaiacol and allyl guaiacol produced decreases on increasing the biomass loading from 3% to 10% and further increases on increasing the biomass loading to 20%. Methyl guaiacol, ethyl guaiacol, vinyl guaiacol and guaiacyl acetone are produced as minor products from pine (FIG. 2d). The amount of guaiacyl acetone decreases with increase in biomass loading. At higher biomass loadings there is a small increase in the minor products generated.

III.6.5 Lignin Breakdown Products from Eucalyptus

Unlike pine, eucalyptus contains a higher amount of syringyl lignin than guaiacyl lignin and all major products (guaiacol, allyl guaiacol, syringol and allyl syringol) are produced (FIG. 2e). The amount of guaiacol and allyl guaiacol decreases with increases in biomass loading. The decrease in the production of these compounds indicated decrease in guaiacyl-lignin breakdown with increase in biomass loading. But the quantity of syringol produced increases on increasing the biomass loading from 3% to 10% and decreases on further increasing the biomass loading. Similar to dissolution of switchgrass, breakdown of guaiacyl-lignin decreases and syringyllignin increases with increase in biomass loading. At higher biomass loading levels of eucalyptus, increasing quantities of ethyl guaiacol, vanillin, guaiacyl acetone and acetosyringone were produced (FIG. 2f).

III.6.6 Temperature Dependence of Lignin Breakdown Products

As shown in the case of kraft lignin, changing the dissolution temperature changes the products that can be recovered from lignocellulosic biomass. A higher quantity of unsaturated guaiacols and aldehydes can be produced by decreasing dissolution temperature, and although not tested here, reaction time. It has been previously reported that vinyl guaiacol is produced from switchgrass when it is pretreated under alkaline conditions (Adler et al., Advances in Chemistry, ACS, 1966:22-35). It has also been reported in the literature that guaiacylacetone is produced under acidic treatment conditions (Adler et al., Advances in Chemistry, ACS, 1966:22-35). Guaiacol and syringol have been reported as the lignin products under acidic pretreatment conditions (Adler et al., Advances in Chemistry, ACS, 1966:22-35; Lai, Y-Z. Wood and Cellulosic Chemistry, 2001:443-512).

Figure 3:
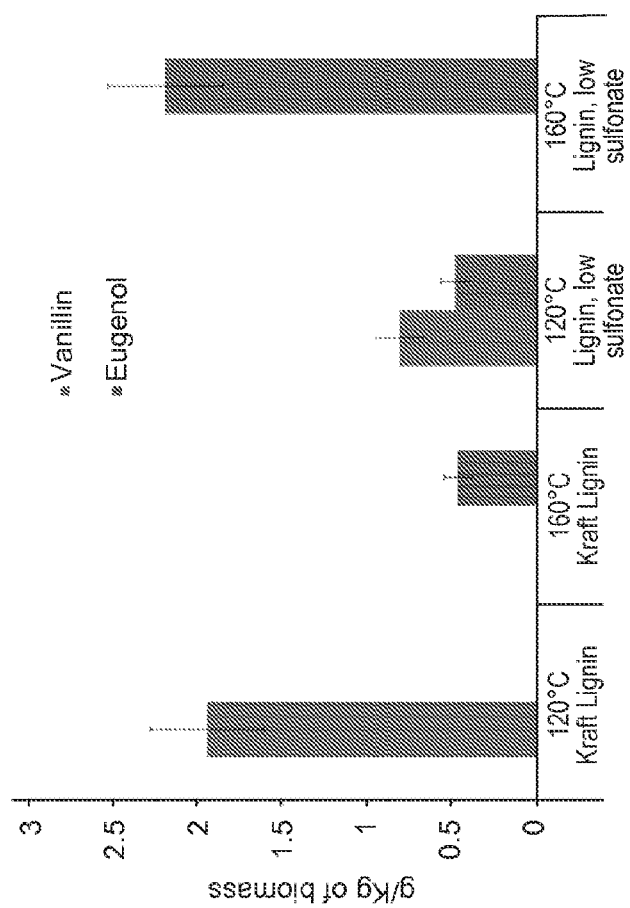
FIG. 3: depicts lignin breakdown products (vanillin and eugenol) from low sulfonate alkali lignin and Kraft lignin after dissolution at 120 and 160° C. for 6 hours at 3% biomass loading.

It is clear from the above discussions that the patterns of degradation products are very different from different biomass and also at different processing temperatures. Based on the final desired products, the dissolution conditions can be tuned to optimize the recovery of certain products. For example, the cleavage of the methyl ketone group from vanillin at higher temperature leads to guaiacol formation, and therefore if it is desired to generate more vanillin from biomass it can be obtained in higher quantities by lowering the process temperatures to 120° C. (FIG. 3). Similarly eugenol and vinyl guaiacol show the most dramatic impact of dissolution temperatures at the two temperatures studied. These examples provide evidence of a very flexible IL technology for lignin breakdown and product optimization. It is important to note that since the putative lignin glass transition temperature (polymeric lignin softens at broad temperature range instead of having a sharp melting point) is around 140-165° C. based on the source of lignin, it is expected that polymeric lignin will be increasingly depolymerized at higher temperatures. The unique characteristics of [$C_2$mim][OAc] induced behavior makes it a promising technology for the selective production of these chemicals while also serving as an efficient means of pretreating biomass (Varanasi et al., Bioresour Technol, 2012, 126:156-61).

III.7 Conclusion

In this study [$C_2$mim][OAc] was used to produce monomeric aromatic compounds from two types of technical lignins and three types of lignocellulosic biomass (pine, switchgrass, and eucalyptus) during pretreatment. Several guiacyl monomers were found to be present in the supernatant of technical lignins and biomass samples after dissolution in [$C_2$mim][OAc] at 160° C. for 6 hrs. Guaiacol was the common product from both technical lignins and biomass, and was produced at higher levels at 3% biomass loading. Higher biomass loadings did not generate more products per kg of starting material. Syringyl monomers were produced on dissolution of switchgrass and eucalyptus. Furthermore, the dissolution conditions can be changed to produce higher amount of the desired byproduct. The total amount of non-polar lignin products ranged from 0.5-5.7 g/kg of biomass. The amount of vanillin produced ranged from 0.04-2.0 g/kg of biomass under two processing temperatures tested. The products reported in this work only represent the nonpolar monomeric components that were soluble in benzene after dissolution. Polar lignin products are expected to be present in the supernatant and can also be extracted. These results indicate that certain ILs used for pretreatment may also hold significant promise in the conversion of polymeric lignin to smaller aromatics and desired renewable chemical outputs.

The invention has been described by way of illustration, and not by limitation. It is to be understood that the particular embodiments depicted in the figures and the terminology which has been used has been intended in a nature of words of description rather than of limitation. It is to be further understood that any combination of the solvents and compositions described in the foregoing paragraphs are deemed to be encompassed by the appended claims. It is to be further understood that all specific embodiments of the method of lignin extraction and biomass treatment are deemed to be encompassed by the appended claims. Many modifications and variations of the present invention are possible in light of the above teachings. It is therefore to be understood that the obvious modifications are deemed to be encompassed within the appended claims.

What is claimed is:

1. A method comprising:
   (i) contacting a starting material comprising a technical lignin with an ionic liquid to generate a solubilized material for at least about 3 hours at a temperature of at least about 160° C.; and
   (ii) extracting low molecular weight or monomeric aromatic lignin compounds from the solubilized material with an extractant, wherein the extractant is a nonpolar solvent; and
   (iii) optionally separating the extracted low molecular weight or monomeric aromatic lignin compounds resulting from step (ii) from the extractant.

2. The method of claim 1, wherein step (ii) comprises
   (a) precipitating a fraction of the solubilized material with a polar solvent to generate a precipitated fraction and a supernatant;
   (b) separating the precipitated fraction from the supernatant; and
   (c) extracting the low molecular weight or monomeric aromatic lignin compounds from the supernatant via liquid-liquid extraction with the nonpolar solvent.

3. The method of claim 2, wherein the polar solvent of step (a) is selected from the group consisting of water, methanol, ethanol, propanol, isopropanol, butanol, pentanol, hexanol, heptanol, octanol, or isooctanol.

4. The method of claim 1, wherein the extractant is selected from the group consisting of benzene, toluene, pentane, hexane, heptane, octane, and isooctane.

5. The method of claim 2, wherein step (ii) further comprises (d) separating the non-polar solvent from the supernatant.

6. The method of claim 1, wherein the ionic liquid is water miscible.

7. The method of claim 1, wherein the ionic liquid is [$C_2$mim][OAc].

8. The method of claim 1, wherein the technical lignin comprises kraft lignin, a lignosulfate, alkali lignin, low sulfonate alkali lignin, or a combination thereof.

9. The method of claim 1, which comprises step (iii).

10. The method of claim 9, wherein step (iii) comprises distillation or column fractionation.

11. The method of claim 1, wherein the extractant is selected from the group consisting of benzene, hexane, and pentane.

12. The method of claim 2, wherein the extractant is selected from the group consisting of benzene, hexane, and pentane.

* * * * *